(P. Plachetta et al.)

United States Patent [19]

Plachetta et al.

[11] Patent Number: 4,847,330
[45] Date of Patent: Jul. 11, 1989

[54] THERMOPLASTIC MOLDING MATERIALS BASED ON NYLONS AND ETHYLENE COPOLYMERS

[75] Inventors: Christoph Plachetta, Limburgerhof; Horst Reimann, Worms; Rainer Theysohn, Frankenthal; Franz G. Mietzner, Ludwigshafen, all of Fed. Rep. of Germany

[73] Assignee: BASF Aktiengesellschaft, Ludwigshafen, Fed. Rep. of Germany

[21] Appl. No.: 135,262

[22] Filed: Dec. 21, 1987

[30] Foreign Application Priority Data

Dec. 30, 1986 [DE] Fed. Rep. of Germany ....... 3644668

[51] Int. Cl.$^4$ .............................................. C08L 77/00
[52] U.S. Cl. .................................. 525/182; 525/183; 525/329.5; 525/329.6; 525/329.7; 525/330.3
[58] Field of Search ............... 525/183, 329.5, 329.6, 525/329.7, 330.3, 182

[56] References Cited

U.S. PATENT DOCUMENTS

| | | |
|---|---|---|
| 3,472,916 | 10/1969 | Anspon et al. |
| 3,523,930 | 8/1970 | Maloney .......................... 525/329,7 |
| 3,700,751 | 10/1972 | Mueller et al. |
| 3,845,163 | 10/1974 | Murch |
| 4,246,371 | 1/1981 | Meyer et al. |
| 4,362,846 | 12/1982 | Korber et al. ....................... 525/183 |
| 4,423,186 | 12/1983 | Grigo et al. ............................ 525/66 |
| 4,554,320 | 11/1985 | Reimann et al. ..................... 525/184 |

FOREIGN PATENT DOCUMENTS 998439 7/1965 United Kingdom.
WO86/06397 11/1986 World Int. Prop. O.

*Primary Examiner*—John C. Bleutge
*Assistant Examiner*—A. Carrillo
*Attorney, Agent, or Firm*—Oblon, Spivak, McClelland, Maier & Neustadt

[57] ABSTRACT

Thermoplastic molding materials contain, as essential components, (A) from 40 to 95% by weight of a nylon and
(B) from 5 to 60% by weight of a noncrosslinked copolymer based on
    (a) from 55 to 79.5% by weight of ethylene,
    (b) from 20 to 40% by weight of one or more primary or secondary $C_2$–$C_8$-alkyl esters of acrylic acid or methacrylic acid,
    (c) from 0.49 to 8% by weight of a monomer having an acid functional group or a latent acid functional group, or of an epoxy-containing monomer of an ethylenically unsaturated monocarboxylic acid, and
    (d) from 0.01 to 2% by weight of an ethylenically unsaturated dicarboxylic acid or of an anhydride of such an acid.

6 Claims, No Drawings

THERMOPLASTIC MOLDING MATERIALS BASED ON NYLONS AND ETHYLENE COPOLYMERS

The present invention relates to thermoplastic molding materials based on nylons and ethylene copolymers, containing, as essential components, (A) from 40 to 95% by weight of a nylon and
(B) from 5 to 60% by weight of a noncrosslinked copolymer based on
  (a) from 55 to 79.5% by weight of ethylene,
  (b) from 20 to 40% by weight of one or more primary or secondary $C_2$–$C_8$-alkyl esters of acrylic acid or methacrylic acid,
  (c) from 0.49 to 8% by weight of a monomer having an acid functional group or a latent acid functional group, or of an epoxy-containing monomer of an ethylenically unsaturated monocarboxylic acid, and
  (d) from 0.01 to 2% by weight of an ethylenically unsaturated dicarboxylic acid or of an anhydride of such an acid.

The present invention furthermore relates to the use of such molding materials for the production of moldings, and to moldings obtainable using such molding materials as essential components.

The mechanical properties of polymers frequently depend on the type of pretreatment which they have received. Thus, the impact strength of nylon moldings depends to a considerable extent on the water content of the moldings.

In the anhydrous state, particularly the moldings produced from readily flowing, preferably highly crystalline nylons of average molecular weight are relatively sensitive to impact. There is therefore a need for rapidly processible, readily flowing nylons from which it is possible to produce, in particular, moldings which have high impact strength in the dry state. Nylons of particular interest are those which possess a combination of high tensile strength, high heat distortion resistance, good resistance to solvents, high impact strength and good flexibility and are easy to process.

It is known that the impact strength and flexibility of nylons can be improved by mixing low molecular weight plasticizers into the nylons. However, this does not provide a satisfactory solution. The majority of plasticizers suitable for plastics are not sufficiently compatible with nylons and separate during processing, or the plasticizers tend to exude from the plastic. Plasticizers which form true solutions with nylons generally have adverse effects on the mechanical properties of the nylons. Highly polar substances having a low molecular weight, such as water or dimethylformamide, have a good plasticizing effect but can be incorporated into the moldings only after production of the latter, since otherwise bubble-containing moldings would be formed during processing of the pretreated nylon granules, owing to the relatively low boiling points of these plasticizers. Furthermore, owing to their high vapor pressure, such plasticizers escape from the treated nylon moldings.

DE-A No. 1 138 922 discloses that the impact strength of nylons can be improved by admixing polymeric substances, such as polyethylene and copolymers of vinyl acetate and ethylene. As a result of partial separation which occurs during processing, moldings produced from such molding materials tend to exhibit crazing.

Polyethylenes which contain acid groups, for example copolymers of ethylene and unsaturated acids, or ethylene grafted to unsaturated acids, can also be mixed into nylons in order to improve the impact strength. Blends of this type are finely dispersed and exhibit less crazing under load than the blends described above, but, apart from the somewhat improved toughness, they have substantially poorer mechanical properties, in particular modulus of elasticity, tensile strength, hardness and rigidity, than the nylons themselves.

According to U.S. Pat. No. 3,472,916 and DE-B No. 1 669 702, a certain improvement is achieved by using copolymers of ethylene and tertiary acrylates or methacrylates and admixing these with nylons. However, these products possess unsatisfactory heat stability. The same applies to the notched impact strength directly after injection molding. The blends disclosed in U.S. Pat. No. 3,845,163 and FR-A No. 1 504 113 also have the same disadvantage and also have additional disadvantages due to the presence of (meth)acrylic acid, some of which is present there in the form of a salt. Thus, the tracking resistance is known to decrease so sharply in the presence of metals that such products can scarcely be used in the electrical industry. Furthermore, most of the metal ions used for neutralization are physiologically unacceptable. Thus, products of this type would not be permitted to be used either in the food packaging sector or as toys.

Copolymers of ethylene, acrylic acid and/or methacrylic acid, and acrylates and/or methacrylates as elasticizing components, have also been added to nylons (cf. DE-A No. 1 241 606). Although this results in an improvement in the impact strength of the nylons, this improvement is still unsatisfactory for some applications.

DE-A No. 27 13 537 describes highly impact-resistant products in which tertiary copolymers of ethylene, 4% by weight of acrylic acid and ethyl or tert-butyl acrylate, as impact modifiers, are mixed into nylon. The nylon used must have a relative viscosity of not less than 3.5. Because of their unsatisfactory flow behavior, such products are very difficult to process.

Finally, EP-A No. 96264 describes blends of nylons and terpolymers of ethylene, n-butyl acrylate and a monomer containing acid functional groups or latent acid functional groups, as an elasticizing component. However, the reproducibility of the impact strength at low temperatures, in particular in the case of complicated moldings, is still not completely satisfactory.

It is an object of the present invention to provide thermoplastic molding materials which have a good overall spectrum of mechanical properties and in particular good reproducibility of the impact strength properties even at low temperatures, in particular when measured on moldings produced from the molding materials.

We have found that this object is achieved, according to the invention, by the thermoplastic molding materials defined at the outset.

Preferred materials of this type are described in the subclaims.

The nylons present as component (A) in the materials are known per se and include the semicrystalline and amorphous resins having weight average molecular weights of not less than 5,000. Such nylons are described in, for example, U.S. Pat. Nos. 2,071,250, 2,071,251, 2,130,523, 2,130,948, 2,241,322, 2,312,966, 2,512,606 and 3,393,210.

The nylons can be prepared, for example, by condensation of equimolar amounts of a saturated or aromatic dicarboxylic acid of 4 to 12 carbon atoms with a diamine of no more than 14 carbon atoms, or by condensation of ω-aminocarboxylic acids or polyaddition of lactams. Examples of nylons are polyhexamethyleneadipamide (nylon 66), polyhexamethyleneazelaamide (nylon 69), polyhexamethylenesebacamide (nylon 610), polyhexamethylenedodecanediamide (nylon 612), the nylons obtained by ring cleavage of lactams, such as polycaprolactam or polylaurolactam, and poly-11-aminoundecanoic acid and a nylon obtained from di-(p-aminocyclohexyl)-methane- and dodecanedioic acid. According to the invention, it is also possible to use nylons prepared by copolycondensation of two or more of the abovementioned polymers or their components, for example a copolymer of adipic acid, isophthalic acid or terephthalic acid and hexamethylenediamine, or copolymers of caprolactam, terephthalic acid and hexamethylenediamine. Preferably, the nylons are linear and have melting points greater than 200° C.

Preferred nylons are polyhexamethyleneadipamide, polyhexamethylenesebacamide and polycaprolactam. The nylons have in general a relative viscosity of from 2.5 to 5, determined on a 1% strength by weight solution in 96% strength sulfuric acid at 23° C.; this corresponds to a molecular weight of about 15,000–45,000. Nylons having a relative viscosity of from 2.5 to 3.5, in particular from 2.6 to 3.4, are preferably used.

The content of the nylons (A) in the novel molding materials is from 40 to 95, preferably from 50 to 90, in particular from 55 to 85, % by weight.

The novel copolymers (B) are noncrosslinked, i.e. they are not less than 90% soluble in hot solvents, such as toluene, methylbenzene or tetrachloroethylene.

The copolymers (B) are derived from
(a) 55–79.5% by weight of ethylene,
(b) 20–40, preferably 25–38, in particular 30–36, % by weight of one or more primary or secondary alkyl esters of acrylic acid or methacrylic acid where alkyl is of 2 to 8 carbon atoms, preferably n-butyl acrylate,
(c) 0.49–8% by weight of a monomer containing acid groups, preferably methacrylic acid or acrylic acid, or of a monomer which has blocked acid groups and forms acid groups under the compounding conditions or polymerization conditions, such as tert-butyl acrylate or tert-butyl methacrylate, or of a monomer having epoxy groups, e.g. glycidyl acrylate and/or glycidyl methacrylate, and
(d) 0.01–2% by weight of an ethylenically unsaturated dicarboxylic acid and/or an anhydride of such an acid.

Examples of components (d) are maleic acid, fumaric acid and maleic anhydride.

The preferred copolymers have a melting range (melting point) of from 40° to 100° C. and a glass transition temperature of less than $-20°$ C., in particular less than $-50°$ C. Particularly advantageous copolymers are those which furthermore have a shear modulus (according to DIN 53,445) of less than 100, in particular less than 50, $Nmm^{-2}$ at $-20°$ C., of less than 50, in particular less than 20, $Nmm^{-2}$ at $0°$ C. and of less than 20, in particular less than 10, $Nmm^{-2}$ at $+20°$ C.

The copolymers (B) generally have a high molecular weight and possess a melt flow index according to DIN 53,735 (measured at 190° C. and under a load of 2.16 kg) of from 2 to 20.

The content of copolymer (B) in the novel molding materials is from 5 to 60, preferably from 5 to 40, in particular from 8 to 25, % by weight. Processes for the preparation of such copolymers are known per se, so that further information is unnecessary here. The preparation is preferably carried out in a conventional manner by polymerization of the components at elevated temperatures under high ethylene pressure.

In addition to the components (A) and (B), the novel thermoplastic molding materials may contain conventional additives and processing assistants, such as stabilizers, antioxidants, heat stabilizers and UV stabilizers, lubricants and mold release agents, colorants, such as dyes and pigments, fibrous and powdered fillers and reinforcing agents, nucleating agents, plasticizers, etc., the amount of which as a rule is not more than 50% by weight, based on the total weight of the molding materials.

The stabilizers can be added to the thermoplastic molding materials at any stage of production, but are preferably added as early as possible in order to prevent decomposition from beginning before the stabilizer has been incorporated. Examples of antioxidants and heat stabilizers are halides of metals of group I of the Periodic Table, for example sodium, potassium and/or lithium halides, if necessary in combination with copper(I) halides, e.g. chlorides, bromides or iodides, sterically hindered phenols, hydroquinones, various substituted members of these groups and mixtures of them, in concentrations up to 1% by weight, based on the weight of the thermoplastic molding material.

UV stabilizers, which are generally used in amounts of up to 2% by weight, based on the molding material, are various substituted resorcinols, salicylates, benzotriazoles and benzophenones.

Lubricants and mold release agents are as a rule added to the molding material in amounts of not more than 1% by weight, based on the total weight. Examples of these are stearic acid, stearyl alcohol and stearamides.

Organic dyes, such as nigrosine, and pigments, such as titanium dioxide, cadmium sulfide, cadmium selenide, phthalocyanines, ultramarine blue and carbon black, may also be added as colorants, as well as fibrous and powdered fillers and reinforcing agents. Examples of the latter are carbon fibres, glass fibers, amorphous silica, asbestos, calcium silicate, aluminum silicate, magnesium carbonate, kaolin, chalk, powdered quartz, mica and feldspar. The amount of these fillers and colorants is in general up to 50% by weight, based on the total weight of the molding materials.

Examples of suitable nucleating agents are talc, calcium fluoride, sodium phenylphosphinate, alumina and finely divided polytetrafluoroethylene.

Examples of plasticizers are dioctyl phthalate, dibenzyl phthalate, butylbenzyl phthalate, hydrocarbon oils, N-(n-butyl)-benzenesulfonamide and o- and p-tolylethylsulfonamide.

The novel molding materials can be produced by a conventional process, for example by mixing in the melt at elevated temperatures. Extruders, for example single-screw or twin-screw extruders, or other conventional plasticizing apparatuses, such as Brabender mills or Banbury mills, are advantageously used for this purpose. However, the preparation may also be carried out by precipitating the components together from a solution or by mixing or dry-blending the components and then extruding the dry mixture in molten form.

It has proven advantageous if the ethylene copolymer (B) is present in the nylon in the form of individual particles which are smaller than 3 μm, preferably smaller than 1 μm.

The novel molding materials are suitable for processing by injection molding or extruding, in particular for the production of heat-stable tough moldings which are subjected to high loads and are required for all types of technical uses.

EXAMPLE 1

To prepare novel molding materials and prior art molding materials, the amounts of nylons and ethylene copolymers stated in Table 1 were mixed in a twin-screw extruder at 280° C. and extruded into a water bath. After granulation and drying, the blends were converted to test specimens on an injection molding machine, and the said specimens were tested in the dry state.

The damaging energy and total penetration energy according to DIN 53,443 (multiaxial impact strength) and the damaging energy in the test box ($W_{50}$) with reference to DIN 53,443, Part 1, are listed in Table 2.

impact strength even at low temperatures, and a very high level of damaging energy in the test box at $-40°$ C. This applies in particular in comparison with the molding materials disclosed in EP-A No. 92 664.

We claim:

1. A thermoplastic molding material containing, as essential components,
   (A) from 40 to 95% by weight of a nylon and
   (B) from 5 to 60% by weight of a noncrosslinked copolymer obtained by the polymerization of the following components at elevated temperature under high ethylene pressure, said components comprising:
      (a) from 55 to 79.5% by weight of ethylene,
      (b) from 20 to 40% by weight of one or more primary or secondary $C_2$–$C_8$-alkyl esters of acrylic acid or methacrylic acid,
      (c) from 0.49 to 8% by weight of a monomer of an ethylenically unsaturated monocarboxylic acid having an acid functional group or a latent acid functional group, or of an epoxy-containing monomer of an ethylenically unsaturated monocarboxylic acid, and
      (d) from 0.01 to 2% by weight of an ethylenically unsaturated dicarboxylic acid or of an anhydride

TABLE 1

| Example no. | Nylon Type | vrel | Amount (% by wt.) | Ethylene copolymer Composition (in % by wt.) | Amount (% by wt.) | MFI (190° C.: 2.16 kg) |
|---|---|---|---|---|---|---|
| 1 V | Polycaprolactam | 3.3 | 80 | — | — | — |
| 2 V | Polycaprolactam | 3.3 | 80 | E/n-BA/AS (60/35/5) | 20 | 10.6 |
| 3 V | Polycaprolactam | 3.3 | 80 | E/n-BA/MSA (64.3/35/0.7) | 20 | 10.3 |
| 4 | Polycaprolactam | 3.3 | 80 | E/n-BA/AS/MSA (59.8/35/4.5/0.7) | 20 | 11.0 |
| 5 V | Polyhexamethylene-adipamide | 2.6 | 80 | — | — | — |
| 6 V | Polyhexamethylene-adipamide | 2.6 | 80 | E/n-BA/AS (60/35/5) | 20 | 10.6 |
| 7 V | Polyhexamethylene-adipamide | 2.6 | 80 | E/n-BA/MSA (64.3/35/0.7) | 20 | 10.3 |
| 8 | Polyhexamethylene-adipamide | 2.6 | 80 | E/n-BA/AS/MSA (59.8/35/4.5/0.7) | 20 | 11.0 |

| Abbreviation | Component |
|---|---|
| E | ethylene |
| n-BA | n-butyl acrylate |
| AS | acrylic acid |
| MSA | maleic anhydride |

TABLE 2

Results of measurements

| Example no. | $W_s^{(1)}$ [Nm] ($-40°$ C.) | $W_{tot}^{(2)}$ [Nm] ($-40°$ C.) | % brittle fractures | $W_{50}^{(3)}$ [Nm] ($-40°$ C.) |
|---|---|---|---|---|
| 1 V | 1 | 1 | 100 | 10 |
| 2 V | 25 | 50 | 40 | 37 |
| 3 V | 33 | 55 | 0 | 91 |
| 4 | 39 | 70 | 0 | 120 |
| 5 V | not measurable | not measurable | 100 | 6 |
| 6 V | 22 | 28 | 80 | 17 |
| 7 V | 32 | 45 | 60 | 35 |
| 8 | 31 | 52 | 0 | 110 |

V = Comparative Experiment
(1)Damaging energy at the disk (2 mm) (DIN 53,443)
(2)Total penetration energy at the disk (2 mm) (DIN 53,443)
(3)Damaging energy in the test box (cf. brochure entitled Ultramid der BASF AG, 1985, page 14, FIG. 7)

The results show that the novel thermoplastic molding materials have very good reproducibility of the of such an acid.

2. A themoplastic molding material as claimed in claim 1, wherein component (b) is n-butyl acrylate.

3. A thermoplastic molding material as claimed in claim 1, wherein component (c) is acrylic acid, methacrylic acid, tert-butyl acrylate, glycidyl acrylate or glycidyl methacrylate or a mixture of these.

4. A thermoplastic molding material as claimed in claim 1, wherein component (d) is maleic anhydride, maleic acid, fumaric acid or a mixture of these.

5. A thermoplastic molding material as claimed in claim 1, wherein component (b) has a melting range of from 40° to 100° C. and a glass transition temperature of less than $-20°$ C.

6. Moldings obtainable using a thermoplastic molding material as claimed in claim 1 as the essential content.

* * * * *